US008458079B2

(12) United States Patent
Aston

(10) Patent No.: US 8,458,079 B2
(45) Date of Patent: Jun. 4, 2013

(54) COMPUTER-IMPLEMENTED SYSTEMS AND METHODS FOR DETERMINING LIQUIDITY CYCLE FOR TRADABLE FINANCIAL PRODUCTS AND FOR DETERMINING FLOW-WEIGHTED AVERAGE PRICING FOR SAME

(75) Inventor: Paul Aston, New York, NY (US)

(73) Assignee: Morgan Stanley, New York, NY (US)

( * ) Notice: Subject to any disclaimer, the term of this patent is extended or adjusted under 35 U.S.C. 154(b) by 418 days.

(21) Appl. No.: 12/904,436

(22) Filed: Oct. 14, 2010

(65) Prior Publication Data
US 2012/0095895 A1 Apr. 19, 2012

(51) Int. Cl.
*G06Q 40/00* (2012.01)
(52) U.S. Cl.
USPC .............................. 705/37; 705/35; 705/36 R
(58) Field of Classification Search
USPC ..................................................... 705/35–37
See application file for complete search history.

(56) References Cited

U.S. PATENT DOCUMENTS

| | | | | |
|---|---|---|---|---|
| 5,101,353 A * | 3/1992 | Lupien et al. | .................... | 705/37 |
| 6,772,132 B1 * | 8/2004 | Kemp et al. | .................... | 705/36 R |
| 6,912,511 B1 * | 6/2005 | Eliezer et al. | .................... | 705/37 |
| 6,938,011 B1 * | 8/2005 | Kemp et al. | .................... | 705/37 |
| 7,110,974 B1 | 9/2006 | Rust | | |
| 7,313,541 B2 * | 12/2007 | Wise et al. | .................. | 705/36 R |
| 7,941,360 B2 | 5/2011 | Zhang et al. | | |
| 8,041,623 B1 * | 10/2011 | Mintz et al. | ....................... | 705/37 |
| 8,140,427 B2 | 3/2012 | Borkovec et al. | | |
| 2002/0069103 A1 | 6/2002 | Puri et al. | | |
| 2003/0225660 A1 | 12/2003 | Noser et al. | | |
| 2003/0233306 A1 | 12/2003 | Madhavan et al. | | |
| 2004/0215549 A1 | 10/2004 | Madhavan et al. | | |
| 2005/0102218 A1 | 5/2005 | Sargent et al. | | |
| 2005/0171887 A1 | 8/2005 | Daley et al. | | |
| 2006/0074762 A1 | 4/2006 | Heising et al. | | |
| 2006/0136326 A1 * | 6/2006 | Heckman et al. | ............... | 705/37 |
| 2008/0109288 A1 | 5/2008 | Borkovec et al. | | |
| 2008/0249924 A1 | 10/2008 | Chiulli et al. | | |

(Continued)

FOREIGN PATENT DOCUMENTS
WO   WO 03/071397 A2   8/2003

OTHER PUBLICATIONS

Avelianeda, Marco and Sasha Stoikov, "High-frequency trading in a limit order book", *Quantitative Finance*, Vol, 8, No. 3, Apr. 2008, pp. 217-224.

(Continued)

*Primary Examiner* — Narayanswamy Subramanian
(74) *Attorney, Agent, or Firm* — K&L Gates LLP

(57) ABSTRACT

Computer-implemented systems and methods for determining a "liquidity cycle" for a tradable financial product. The liquidity cycle has a liquidity cycle time period that is made up of multiple discrete time intervals, and the liquidity cycle indicates an expected distribution of order flow at each discrete time interval over the liquidity cycle time period. The liquidity cycle is determined based on tick data for the financial product. The tick data can comprise time-stamped indicative price quotes for the financial product and/or time-stamped price data for completed transactions involving the financial product. The liquidity cycle can be used to compute a Flow-Weighted Average Price (FWAP) for the financial product over a specified FWAP trade time window. An investor may agree with the trader to buy or sell (depending on the side of the transaction) the financial product at the FWAP.

31 Claims, 4 Drawing Sheets

U.S. PATENT DOCUMENTS

| | | | |
|---|---|---|---|
| 2009/0006231 | A1 | 1/2009 | Zhang et al. |
| 2009/0076978 | A1* | 3/2009 | Dayan .................... 705/36 R |
| 2010/0121755 | A1 | 5/2010 | Spurgin et al. |
| 2011/0016037 | A1* | 1/2011 | Tumen ..................... 705/37 |
| 2011/0196773 | A1 | 8/2011 | Fatica et al. |
| 2012/0046912 | A1* | 2/2012 | Indukuru et al. .......... 702/186 |

OTHER PUBLICATIONS

Guéant, et al "Dealing with the Inventory Risk, A solution to the market making problem", Paris, France, Europlace Institute of Finance, Mar. 2012, pp. 1-32.

AES® FX, Guiding You in FX, Credit Suisse Group AG, Mar. 2010, 2 pages.

Lin, Victor, "Trading Strategy, Cost Efficiencies in FX Algo Trading", Market Commentary, Portfolio Strategy, Credit Suisse, AES®, Apr. 22, 2010, 9 pages.

Lin, Victor, "Trading Strategy, Getting Sophisticated", Market Commentary, Portfolio Strategy, Credit Suisse, AES®, Oct. 28, 2010, 8 pages.

Brandes, Yosi, "Transaction Costs and Equity Portfolio Capacity Analysis", Investment Technology Group, Aug. 2009, 9 pages.

RBS FIX, "Execute with transparency and confidence", RBSMarketplace, The Royal Bank of Scotland, Aug. 2010, 2 pages.

* cited by examiner

COMPUTER-IMPLEMENTED SYSTEMS AND METHODS FOR DETERMINING LIQUIDITY CYCLE FOR TRADABLE FINANCIAL PRODUCTS AND FOR DETERMINING FLOW-WEIGHTED AVERAGE PRICING FOR SAME

CROSS-REFERENCE TO RELATED APPLICATIONS

This application incorporates by reference in its entirety the concurrently filed application by Paul Aston, entitled "COMPUTER-IMPLEMENTED SYSTEMS AND METHODS FOR CALCULATING ESTIMATED TRANSACTION COSTS FOR TRANSACTIONS INVOLVING TRADABLE FINANCIAL PRODUCTS," Ser. No. 12/904,442.

BACKGROUND

Equity products, such as stock, are typically traded on exchanges, such as the New York Stock Exchange. Such exchanges provide a centralized source for trading data regarding the stocks traded on the exchange, including liquidity. Liquidity data from stock exchanges commonly includes the size of limit orders for a particular stock on the exchange (i.e., the number of shares to be bought or sold at the specified limit price) and/or the size of completed transactions for the stock. The available liquidity data permits investors to implement volume-based algorithmic trading, such as Volume-Weighted Average Price (VWAP) trading, in which trades for a stock are made over a time horizon in proportion to the volume at which the stock was traded on the exchange over the time horizon. VWAP trading is often considered to, in general, reduce transaction costs by minimizing market impact (the adverse effect of a trader's activities on the price of the stock).

Foreign currency exchange (FX) products, however, are traded in over-the-counter (OTC) markets, so there is no exchange to act as a centralized source for trade volume data for FX products. As a result, VWAP trading for FX products based on the actual trade volume, as implemented for exchange traded assets, is not available. There are some public trading platforms, such as EBS and Reuters, for FX products that publish selective tick data to subscribers. The tick data published to subscribers by such trading platforms includes some of the indicative quotes (e.g., limit orders) for the FX product and some of the completed trade data, but this data does not typically include trade volume data and what information is provided is particular to the specific platform where it is measured and may be partially censored.

It is known to execute time-weighted average pricing for FX, in which a certain amount of a foreign currency is purchased/sold at periodic times interval over a time horizon. It is also known to execute volume-weighted average pricing for FX where volume for the FX product at each time interval in the time horizon is estimated since trade volume data for FX products is not typically published by trading platforms like EBS and Reuters for all currencies.

SUMMARY

In one general aspect, the present invention is directed to computer-implemented systems and methods for determining a "liquidity cycle" for a tradable financial product. The liquidity cycle has a liquidity cycle time period that is made up of multiple discrete time intervals, and the liquidity cycle indicates an expected distribution of order flow at each discrete time interval over the liquidity cycle time period. The liquidity cycle is determined based on tick data for the financial product. The tick data can comprise time-stamped indicative price quotes for the financial product and/or time-stamped price data for completed transactions involving the financial product. The liquidity cycle can be used to compute a Flow-Weighted Average Price (FWAP) for the financial product over a specified FWAP trade time window. An investor may agree with the trader to buy or sell (depending on the side of the transaction) the financial product at the FWAP. When using third party tick data and pre-published liquidity cycles, FWAP pricing is more transparent to an investor than VWAP pricing based on estimates of volume. These and other benefits of the present invention will be apparent from the description below.

FIGURES

Various embodiments of the present invention are described herein below in conjunction with the following figures, wherein.

DESCRIPTION

Various non-limiting embodiments of the present disclosure will now be described to provide an overall understanding of the principles of the structure, function, manufacture, and use of the systems and methods described herein for determining a liquidity cycle and flow-weighted average pricing for tradable financial products. In the description to follow, the tradable financial products are generally foreign currency exchange (FX) pairs (such as Euro-U.S. Dollar (sometimes denominated "EURUSD")) used in spot trading of foreign currency, although the present invention is not so limited and it should be recognized that the systems and methods of the present invention could be used for other types of tradable financial products where the market participant (e.g., investor) wants a price based on liquidity, such as equities (e.g., stock), debt (e.g., bonds), and derivative contracts (futures, options, commodities, etc.). One or more examples of these non-limiting embodiments are illustrated in the accompanying drawings. It will be appreciated that the systems and methods specifically described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

FX products are typically expressed in pairs, with a left-hand currency and a right-hand currency, such as EURUSD (Euro-U.S. Dollar), USDJPY (U.S. Dollar-Japanese Yen), GBPUSD (Great Britain Pound-U.S. Dollar), USDCHF (U.S. Dollar-Swiss Franc), and many others. A FX market participant can buy the left-hand currency by selling the right-hand currency and vice versa. The spot markets for FX products are typically over-the-counter (OTC) markets and some spot FX trading platforms presently exist, such as the EBS and Reuters. A trader receiving an order from a customer/FX market participant may place the customer's order with one of the trading platforms or some other FX market for execution.

Figure 1:
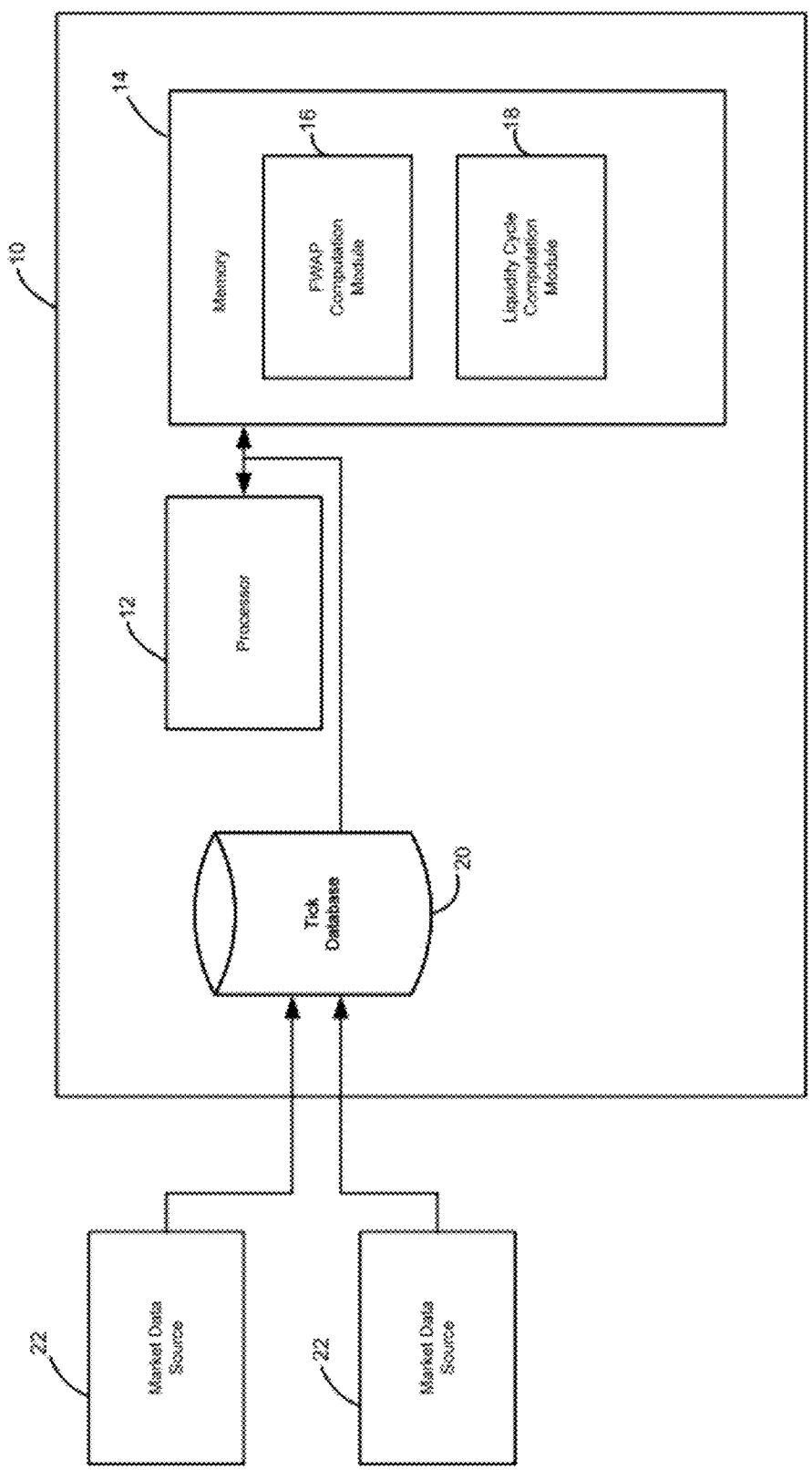
FIG. 1 is block diagram of a computer system for determining a liquidity cycle for a tradable financial product and for computing a FWAP for the tradable financial product according to various embodiments of the present invention.

FIG. 1 is a diagram of a computer system 10 for determining flow-weighted average pricing for a tradable financial product (such as a FX pair) according to various embodiments of the present invention. "Flow" in this context generally refers to financial market tick data per time period, wherein the ticks are time-stamp order/quote data and/or time-stamped data regarding completed transactions for the financial product. The flow-weighted average price (FWAP) may be used as a fair-value execution benchmark. The FWAP may also be used as a negotiated exchange rate for the basis of a currency transaction, where a market participant may place a trade order to buy or sell a specified amount of currency at the FWAP with a dealer who agrees to deliver or receive the currency at the FWAP price As described below, the FWAP may be calculated using a liquidity cycle for the financial product, which liquidity cycle indicates the time distribution of liquidity for the financial product observed throughout a time period (the "cycle time period"), such as one 24-hour time period. A description of how to compute the liquidity cycle is provided after a description of how to compute a FWAP for a financial product is provided. The computer system 10 of FIG. 1 may be used to compute (or generate) the liquidity cycle as well. Before describing the mechanisms for computing the FWAP and liquidity cycle, a brief description of the computer system 10 is provided.

The computer system 10 may comprise one or more networked, electronic computer devices, such as servers, personal computers, workstations, mainframes, laptops, and/or handheld computing devices. The computer device(s) may comprise one or more processors 12 and one or more computer memories 14. The processor(s) 12 and the computer memory(ies) 14 may comprise integrated circuits, for example. In one embodiment, the processor(s) 12 and the computer memory(ies) 14 may comprise separate integrated circuits, although in other embodiments they may be combined in a common integrated circuit. For convenience, only one processor 12 and only one memory 14 are shown in FIG. 1. The processor 12 may have one or multiple cores. The memory 14 may comprise primary computer memory, such as a read only memory (ROM) and/or a random access memory (e.g., a RAM). The memory could also comprise secondary memory, such as magnetic or optical disk drives or flash memory, for example.

As shown in FIG. 1, the memory 14 may comprise a FWAP computation module 16 and a liquidity cycle computation module 18. The FWAP computation module 16 may comprise computer software instructions that when executed by the processor 12 cause the processor 12 to compute a FWAP for a trade involving a tradable financial product, such as a FX currency pair, using the FWAP computation techniques described herein. The liquidity cycle computation module 18 may comprise computer software instructions that when executed by the processor 12 cause the processor 12 to compute the liquidity cycle for the financial product using the liquidity cycle computation technique described herein. The liquidity cycle computation module 18 may compute the liquidity cycle based on data stored in a database 20. The database 20 may store tick data received from one or more market data sources 22. The tick data may comprise time-stamped price data published by the market data sources 22. The tick data may comprise: (1) time-stamped indicative price quotes (i.e., limit orders to buy or sell the financial product at a specified price) and (2) time-stamped data regarding completed transactions involving the financial product. For FX, time-stamped data regarding completed transactions are often referred to as "paid-given" data, which indicates the price paid and given for an executed FX transaction involving a currency pair. As mentioned above, FX tick data published by third-party market sources 22 typically does not comprise volume data.

The market data sources 22 preferably are third-party sources (i.e., sources not affiliated with the trader) that publish tick data electronically to subscribers. For example, the market data sources 22 may comprise trading platforms, such as the EBS and/or Reuters FX public trading platforms, that publish to subscribers FX tick data for their respective trading platform. Typically such platforms distribute only a portion of the tick data to subscribers, so in such circumstances the computer system 10 uses whatever tick data it gets from the trading platforms. Although using tick data from public, third-party trading platforms is preferable for transparency reasons, in other embodiments the market data sources 22 may also comprise non-third-party sources, such as trading desks of the trader's institution.

The tick data may be sent electronically from the market sources 22 to the computer system 10 using any suitable data communications network, such as Ethernet, LAN, WAN, intranets, and/or the Internet, using any suitable data communication protocol, such as TCP/IP, HTTP or FTP. The tick data received by the computer system 10 may be stored in the database 20. More details about storing tick data in a computer database are described in published U.S. patent application Pub. No. 2010/0082417, titled "Database For Financial Market Data Storage and Retrieval," Ser. No. 12/236,915, filed Sep. 24, 2008, which is incorporated herein by reference in its entirety.

If a FX market participant wants to buy one currency (say, EUR) selling a second currency (say, USD) over a time window (or period), the FX market participant may desire to buy the first currency at the FWAP. In various embodiments, the processor 12, when executing the code of the FWAP computation module 16, may compute the FWAP according to the following equation:

$$FWAP = (1 \pm \text{spread}) \sum_{n=1}^{N} w_n p_n \quad (1)$$

where:

FWAP is the flow-weighted average price;

N is the number of pricing intervals in the FWAP trade time window, where the FWAP trade time window extends from a start time t to and end time T, such that the number of pricing intervals is N=(T−t)/m, where m represents the duration of each pricing interval (the duration m may be any suitable length of time, such as x seconds, minutes, hours or days, where x>0)

$p_n$ is the representative price associated with the $n^{th}$ pricing interval. The $n^{th}$ pricing interval has a time duration m and extends from time $t+m(n-1)$ to time $t+mn$. In this example, the prices are defined as the number of the right-hand side units of currency that are required to purchase one left-hand side unit of currency. The prices $p_n$ may be determined based on the tick data, and may be defined generally as a statistic measured over a particular time interval, which could include an observed spot price at a particular point in time as a special case;

$w_n$ represents the corresponding weight associated with the $n^{th}$ pricing interval. The process for determining the weights, which are based on the liquidity cycle, is described below; and spread may be quoted in basis points ($1/100^{th}$ of a percent), where if the FX market participant is buying the left-hand currency the spread is added, and if the FX market participant is selling the left-hand currency the spread is subtracted. The spread may be indicative of the dealer mark-up over a representative price, such as a mid-price, an inside quote, or some other representative price, and can be related to the transaction costs for the trade. If the spread equals zero, the FWAP becomes:

$$FWAP = \sum_{n=1}^{N} w_n p_n \quad (2)$$

For example, assume a FX market participant wants to buy 100 Mm EUR, selling USD, at the FWAP defined over a time window beginning at 12:00 London time and ending at 12:15 London time, using one-minute pricing intervals. In this example, N=15 and the representative price $p_n$ for each time interval may be defined as the median of all mid-price ticks observed during the corresponding one-minute interval. Thus, the FWAP will be the sum product of the fifteen (15) minute-bar prices and the fifteen (15) corresponding weights (adjusted by the spread, if any; the spread would be added in this example since the customer is buying the left-hand currency (EUR)).

Figure 2:
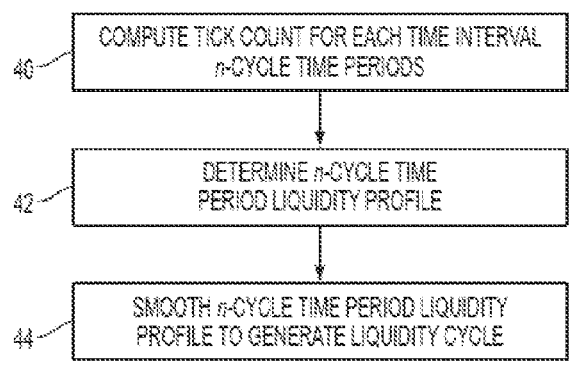
FIG. 2 is flowchart of a process for generating the liquidity cycle for a tradable financial product according to various embodiments of the present invention.

The weights $w_n$ are preferably determined based on the liquidity cycle for the financial product, which liquidity cycle may be determined by the liquidity cycle computation module 18 using tick data stored in the tick data database 20 according to various embodiments. FIG. 2 is a diagram of a process flow performed by the computer system 10 when executing the code of the liquidity cycle computation module 18 to compute the weights $w_n$ according to various embodiments. The liquidity cycle may span a specified cycle time period, such as one 24-hour time period, and may comprise a number of discrete, contiguous sub-time intervals (often referred to as "pricing intervals"). The pricing intervals may have a duration of x seconds, minutes, hours, etc., where x>0. In one embodiment, the pricing intervals may be one minute time intervals. Accordingly, at step 40, a tick count for the financial product (and/or related, similar financial products) for each pricing interval over n cycle time periods is computed based on the tick data stored in the database 20. In this example, the cycle time period is one 24-hour time period, so the tick count is computed for each pricing interval over a look-back period of n cycle time periods (e.g., n days). Generally, the greater n the better; preferably, n is ten cycle time periods (e.g., ten trading days) or more, and more preferably twenty trading days or more. In various embodiments, the tick count observed during the pricing interval may be defined as the weighted-average of the number of ticks (e.g., indicative price quotes and/or paid-given transactions) counted from each market data source 22, and may be a blend of indicative quote counts and paid-given counts. For example, the tick count from one market source for a pricing interval may be:

Tick Count=a (number of paid-given ticks in pricing interval)+b (number of indicative price quotes in pricing interval)

where, for example, a=1 and b<1 (such as b=0.1). If it is assumed that the order for each tick has an acceptably small deviation from the actual order size, the tick count can be considered generally proportional to the volume traded for the financial product. Preferably the tick data is high frequency, such that there are multiple possible unique time stamps of tick data within one pricing interval (e.g., within one one-minute bar).

Next, at step 42, a n-cycle time period liquidity profile for the financial product is determined. The n-cycle time period liquidity profile may be determined by first, for each discrete pricing interval in the cycle time period (e.g., each one-minute time bar in the day), adding the tick count for the pricing interval for each of the n cycle time periods in the look-back period (i.e., n-cycle time periods), looking back from the calculation date. Such data may be stored in the database 20. For example, if n=3, the tick counts for the time interval 8:00 to 8:01 for each of the three days in the look back period are summed, and this is done for each pricing interval (e.g., one-minute bar) in the cycle time period. These values (the aggregated tick count for each pricing interval in the cycle time period) are then divided by the total number of ticks observed during the n-cycle time periods (e.g., the tick count for day 1 plus the tick count for day 2 plus the tick count for day 3). The result, which is the n-cycle time period liquidity profile, represents the sample average distribution of daily order flow per pricing interval (e.g., one-minute bars) throughout the day (or cycle time period).

At step 44, the n-cycle time period (e.g., day) liquidity profile is smoothed to generate the liquidity cycle. The liquidity cycle represents the expected distribution of order flow for the cycle time period (e.g., intra-daily order flow when the cycle is one day) by pricing interval. That is, the liquidity cycle generally indicates the probability density function for a set of received orders during the cycle time period. It is essentially a sequence of weights observed at the different periodic intervals, where each weight represents the proportion of total order flow that is observed at a particular point in time (the pricing interval) during a transaction implementation period. Any suitable mathematical smoothing function may be used, such as spectral analysis or filtering. For example, in various embodiments a discrete sample analog to the spectral representation theorem may be used. Preferably, at least eight (8) spectral filters (corresponding to the eight most fundamental frequencies) are used to smooth the liquidity profile. In other embodiments, other smoothing functions may be used, including Fast Fourier transform, interpolation, and moving average.

Figure 3:
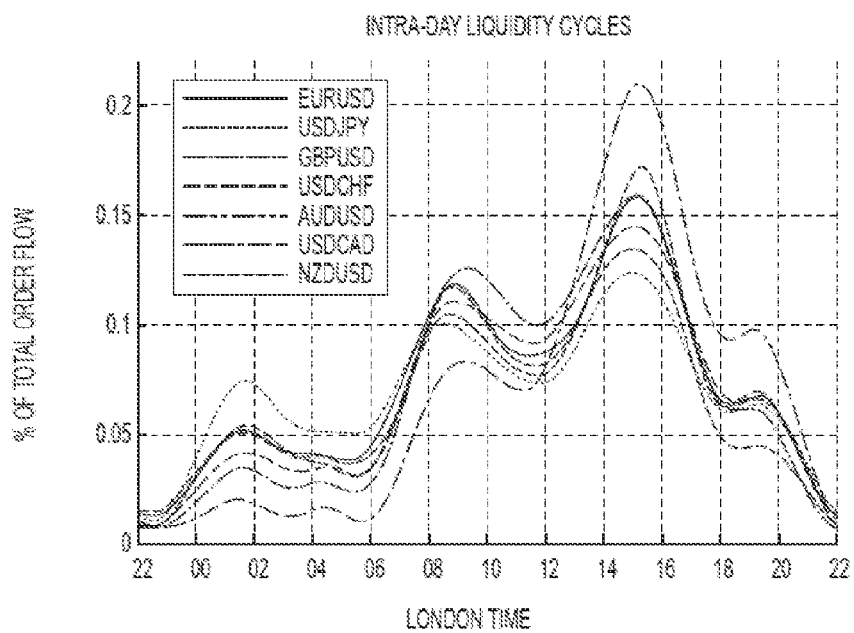
FIG. 3 is a chart showing exemplary liquidity cycles for different FX products according to various embodiments of the present invention.

FIG. 3 is a graph that shows liquidity cycles for various FX currency pairs over a 24-hour cycle (22:00 London time to 22:00 London time). As shown in the example of FIG. 3, there are three separate peaks in the various cycles that generally coincide with the exchange hours of the major regional market centers, starting with Asia/Pacific exchanges, followed by European exchanges and, finally, the North American exchanges. The liquidity cycles shown in FIG. 3 were measured using high-frequency tick data observed throughout 2009.

The liquidity cycles for various FX trading pairs may be computed from time to time, such as daily or monthly. Also, the liquidity cycles could be computed in real-time in various embodiments. Preferably, the most current liquidity cycle for a financial product—or the one used to determine the weights $w_n$ for the FWAP—are published or otherwise made available to FX market participants so that the FX market participants can factor in the expected time-varying liquidity of the financial product when specifying an order to be priced using FWAP. The values of the liquidity cycle for each pricing interval correspond to the weights $w_n$ used in the FWAP equation (1) when the FWAP trade time window spans the time period of the liquidity cycle, and the sum of the weights $w_n$ over the liquidity cycle equals one. If the FWAP trade time window is a fraction of the liquidity cycle, the values of the liquidity cycle can be normalized so that the sum of the weights $w_n$ for the FWAP trade time window still equals one. The flow weight for the $n^{th}$ interval $w_n$ in the FWAP equation (1) may correspond to the percent of total order flow during the $n^{th}$ interval for the FWAP trade time window (that is, the time period t to T). The FWAP trade time window could be one 24-hour period or, more commonly, some portion of a trading day, such as several minutes (e.g., 15 minutes, 30 minutes, 60 minutes, etc.). If the FWAP trade time window corresponds to one full cycle time period, the weights $w_n$ will correspond to the percent of total order flow during the $n^{th}$ interval over the cycle time period. If the FWAP trade time window corresponds to a fraction of the cycle time period, the weights $w_n$ are effectively normalized to the FWAP trade time window such that the weights $w_n$ correspond to the percent of total order flow during the $n^{th}$ interval over the FWAP pricing window.

Figure 4:
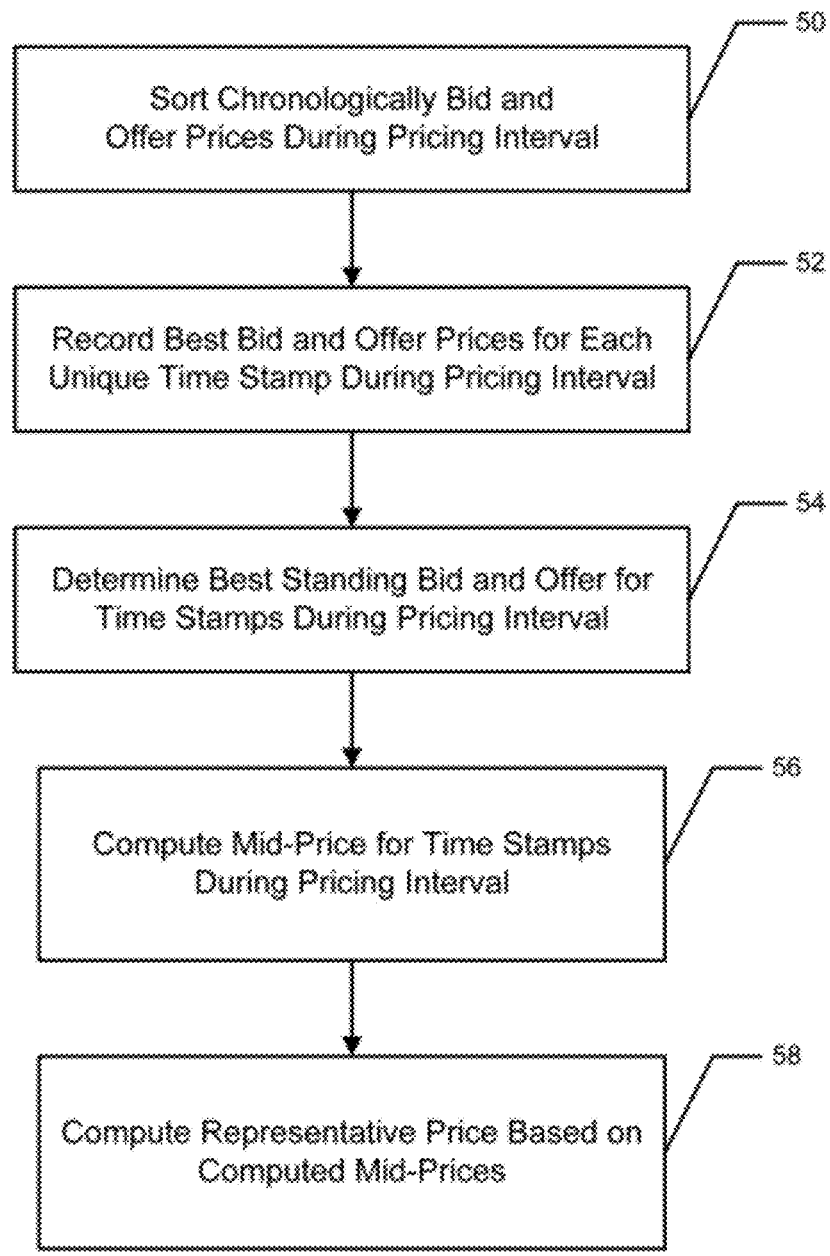
FIG. 4 is a flowchart of a process for determining representative prices to be used in the FWAP computation according to various embodiments of the present invention.

The representative prices $p_n$ in the FWAP equation (1) may be statistical prices that are respectively associated with a corresponding pricing interval in the FWAP trade time window. FIG. 4 is a process flow of one embodiment to compute the representative price for a particular pricing interval based on the tick data stored in the database 20. The process may be performed for each pricing interval in the FWAP trade time window by the processor 12 when executing the FWAP computation module 16. At step 50, all of the observed bid and offer prices during the pricing interval are sorted chronologically based on the time stamp. The time stamp may have greater resolution (e.g., by second or millisecond) than the pricing interval (e.g., one-minute bar), so that there may be several discrete time stamp instances for one pricing interval. At step 52, for each unique time stamp in the pricing interval, the best (highest) indicative bid and the best (lowest) indicative offer price are recorded or otherwise detected. This process effectively amounts to the creation of a limit order book for the financial product.

At step 54, standing bids and standing offers at different time stamps during the pricing interval are determined. According to various embodiments, the particular sequence of unique time stamps observed during the pricing interval is identified by pooling all indicative bids and offers, obtained from all sources, and all paid and given transactions, obtained from all sources, and sorting these in chronological order. Once sorted, the sequence of unique time stamps during the pricing interval are identified. For each of these unique time stamps the standing bid at a particular time stamp is defined as the maximum of the best (highest) indicative bid and best (highest) given price (from the paid-given data) with the time stamp, and the standing offer for a particular time stamp is defined as the minimum of the best (lowest) indicative offer and the best (lowest) paid price (from the paid-given data) for the time stamp. If no indicative quotes or paid-given data is available at a particular time stamp, preventing the calculation of either the standing bid or offer for the time stamp per the above-described process, the last standing bid or offer may be carried forward as required. For example, assume that at a particular time stamp there are three indicative bids of 47, 48, and 49 (around a big figure of 1.45) and three indicative offers at 51, 52, and 53. Also assume that a deal was paid (i.e. a standing offer was lifted) at 50 for the time stamp. That means, in this example, that the best standing bid was 49 for this time stamp and the best standing offer was 50 (because a paid event implies that a standing offer at 50 was lifted by a bidder). Thus, the minimum of an indicative offer at 51 and paid transaction at 50 implies that the standing offer at the time stamp must have been 50. In a similar way, a given transaction reveals the value of a standing bid at a time stamp since a given price implies that a standing bid was hit by a seller. These groupings may be sorted in chronological order based on time stamp to determine the standing bids and offers at the various time stamps.

Next, at step 56, according to various embodiments, mid-prices are computed for every time stamp in the pricing interval. The mid-price for a particular time stamp may be computed as the sum of the best standing bid and the best standing offer, divided by two. If there is no offer or bid indicative quote for a particular time stamp, the best standing bid or best standing offer is carried over from the immediately prior time stamp.

Next, at step 58, according to various embodiments, the representative price $p_n$ associated with a particular pricing interval may be computed as a statistical function of the mid-prices. Any suitable statistical function for determining the representative price $p_n$ may be used. For example, according to various embodiments, the representative price $p_n$ may be: the median of all mid-prices over the pricing interval; the average of the mid-prices of the pricing interval; the last observed mid-price in the pricing interval; the first observed mid-price in the pricing interval; etc.

With the representative prices $p_n$ for each pricing interval in the time-window determined, and with the weights $w_n$ determinable from the liquidity cycle, the FWAP can be computed per equation (1) above. Using the prior example where a FX market participant wants to buy 100 Mm EUR selling USD at the FWAP defined over the time window beginning at 12:00 London time and ending at 12:15 London time, using one-minute pricing intervals, assume the spread is one bps and the prices and weights are as shown below for each pricing interval.

TABLE 1

| TIME | EURUSD PRICE | SPREAD (bps) | PRICE PLUS SPREAD | WEIGHT |
| --- | --- | --- | --- | --- |
| 12:01 | 1.2918 | 1 | 1.2919 | .0656 |
| 12:02 | 1.2919 | 1 | 1.2920 | .0658 |
| 12:03 | 1.2921 | 1 | 1.2922 | .0659 |
| 12:04 | 1.2927 | 1 | 1.2928 | .0661 |
| 12:05 | 1.2924 | 1 | 1.2925 | .0662 |
| 12:06 | 1.2924 | 1 | 1.2925 | .0664 |
| 12:07 | 1.2922 | 1 | 1.2923 | .0665 |
| 12:08 | 1.2918 | 1 | 1.2919 | .0667 |
| 12:09 | 1.2921 | 1 | 1.2922 | .0668 |
| 12:10 | 1.2921 | 1 | 1.2922 | .0670 |
| 12:11 | 1.2926 | 1 | 1.2927 | .0671 |
| 12:12 | 1.2929 | 1 | 1.2930 | .0673 |
| 12:13 | 1.2927 | 1 | 1.2928 | .0674 |
| 12:14 | 1.2930 | 1 | 1.2931 | .0676 |
| 12:15 | 1.2930 | 1 | 1.2931 | .0677 |

In this example, using equation (1), the FWAP=1.2925. In Table 1, the indicated weights are normalized to the applicable time window in the liquidity cycle so that the sum of the weights equals one.

Figure 5:
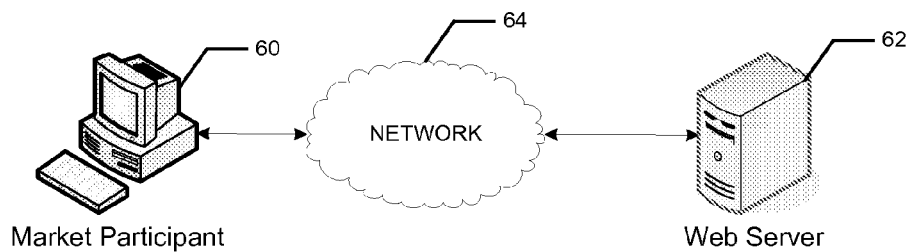
FIG. 5 is a diagram of a computer system for placing a FWAP order according to various embodiments of the present invention.

In various embodiments, a market participant may place an order for a FWAP trade with a trader via a telephone network. In other embodiments, as shown in FIG. 5, the market participant 60 may place the FWAP order via a web-based user interface. The web-based user interface may be hosted by one or more web servers 62 associated with the trader for the market participant 60. The market participant 60 may connected to the web server 62 via a data communications network 64, such as the Internet. The web pages served by the web server 62 may allow the market participant 60 to specify the particulars for a FWAP trade, including: (i) the financial product (e.g., currency pair for spot FX trade); (ii) the starting and ending times for the FWAP trade time window, and (iii) the number of pricing intervals in the time window. The web site may also indicate the market sources 22 used for the tick data, so that the market participant 60 has transparency into the source of the tick data used to determine the weights $w_n$ and the representative prices $p_n$ for the FWAP calculation. The applicable spread for the trade may also be indicated on the web site. Further, the applicable liquidity cycle (i.e., the liquidity cycle used to determine the weights $w_n$ for the FWAP calculation) may be provided to the market participant 60 by the web server 62. The market participant 60 may specify the start and end times of the FWAP trade time window may using text boxes or drop down windows, or graphically relative to the liquidity cycle by adjusting, for example, start and end time markers corresponding to the desired FWAP trade time window on the liquidity cycle.

Once the relevant information is entered and/or agreed upon via the web-based user interface, and once the tick data for the FWAP trade time window is received (so that the representative prices $p_n$ can be determined, as described above), the web server 62 (or some other computer system in communication with the web server 62) may calculate the FWAP, in which case the trader may commit to the market participant 60 to pay the FWAP for the trade. The trader then executes the trader, preferably for the trader at or better than the FWAP.

Figure 6:
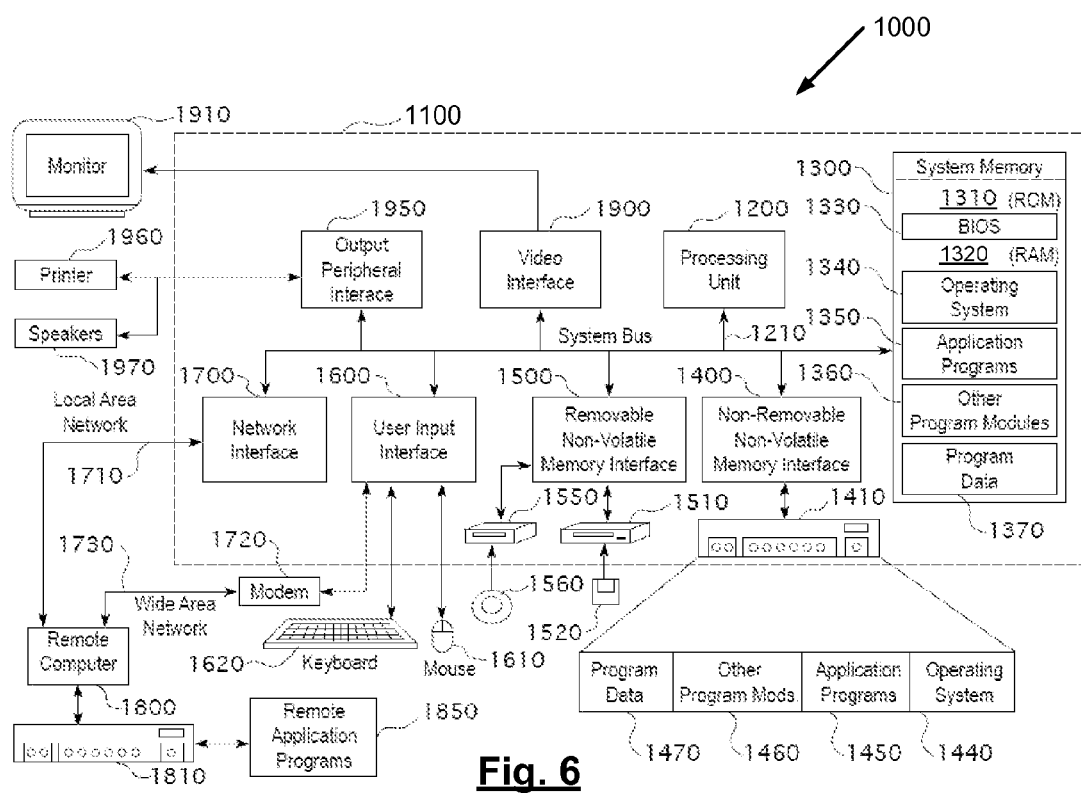
FIG. 6 is a diagram of a computing environment according to various embodiments of the present invention.

FIG. 6 and the following discussion are intended to provide a brief general description of a suitable computing environment in which the described embodiments of the computer system 10 may be implemented. It should be understood, however, that handheld, portable, and other computing devices and computing objects of all kinds are contemplated for use in connection with the described embodiments. FIG. 6 illustrates one example of a suitable computing system environment 1000 in which the described embodiments may be implemented, such as for the computer system 10. Although as made clear above, the computing system environment 1000 is only one example of a suitable computing environment and is not intended to suggest any limitation as to the scope of use or functionality of the described embodiments. Neither should the computing environment 1000 be interpreted as having any dependency or requirement relating to any one or combination of components illustrated in the operating computing environment 1000. With reference to FIG. 6, one embodiment of a system for implementing the described embodiments comprises a general-purpose computing device in the form of a computer system 1100. Components of the computer system 1100 may comprise a processing unit 1200, a system memory 1300, and a system bus 1210 that couples various system components including the system memory 1300 to the processing unit 1200. The system bus 1210 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer system 1100 generally comprises a variety of computer readable media. Computer readable media can be any available media that can be accessed by the computer system 1100 and includes both volatile and nonvolatile media, removable, and non-removable media. Computer storage media includes volatile and nonvolatile, removable, and non-removable media implemented in any method or technology for storage of information such as computer readable instructions, data structures, program modules, or other data. The tick data may be stored in nonvolatile memory of the computer system 1100. Computer storage media includes, but is not limited to, Random Access Memory (RAM), Dynamic RAM (DRAM), Double-Data-Rate DRAM (DDRAM), Synchronous DRAM (SDRAM), Static RAM (SRAM), Programmable ROM (PROM), Read Only Memory (ROM), Electrically Erasable Programmable Read Only Memory (EEPROM), flash memory, polymer memory such as ferroelectric polymer memory, ovonic memory, phase change or ferroelectric memory, silicon-oxide-nitride-oxide-silicon (SONOS) memory, Compact Disk Read Only Memory (CDROM), Compact Disc-rewritable (CDRW) Digital Versatile Disks (DVD) or other optical disk storage, magnetic cassettes, magnetic tape, magnetic disk storage or other magnetic storage devices, or any other medium which can be used to store the desired information and which can be accessed by the computer system 1100. It is worthy to note that some portion or the entire computer storage medium may be included in other elements of the apparatus computer system 1100. For instance, some or all of computer storage medium may be included on the same integrated circuit or chip with elements of the computer system 1100 (e.g., processing unit 1200). Alternatively, some portion or the entire computer storage medium may be disposed on an integrated circuit or other medium (e.g., a hard disk drive) that is external.

The system memory 1300 includes computer storage media in the form of volatile and/or nonvolatile memory such as ROM 1310 and RAM 1320. A basic input/output system 1330 (BIOS), containing the basic routines that help to transfer information between elements within the computer system 1100, such as during start-up, is typically stored in the ROM 1310. The RAM 1320 typically contains data and/or program modules that are immediately accessible to and/or presently being operated on by the processing unit 1200. By way of example, and not limitation, FIG. 6 illustrates an operating system 1340, one or more application programs 1350, other program modules 1360, and program data 1370.

The computer system 1100 also may comprise other removable/non-removable, volatile/nonvolatile computer storage media. By way of example only, FIG. 6 illustrates a hard disk drive 1410 that reads data from or writes data to non-removable, nonvolatile magnetic media, a magnetic disk drive 1510 that reads data from or writes data to a removable, nonvolatile magnetic disk 1520, and an optical disk drive 1550 that reads data from or writes data to a removable, nonvolatile optical disk 1560, such as a CD ROM, CDRW or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1410 is typically connected to the system bus 1210 through a non-removable memory interface such as interface 1400, and magnetic disk drive 1510 and optical disk drive 1550 are typically connected to the system bus 1210 by a removable memory interface, such as interface 1500.

The drives and their associated computer storage media discussed above and illustrated in FIG. 6 provide storage of computer readable instructions, data structures, program modules, and other data for the computer system 1100. In FIG. 6, for example, the hard disk drive 1410 is illustrated as storing an operating system 1440, one or more application programs 1450, other program modules 1460, and program data 1470. Note that these components can either be the same as or different from the operating system 1340, the one or more application programs 1350, the other program modules 1360, and the program data 1370. The operating system 1440, the one or more application programs 1450, the other program modules 1460, and the program data 1470 are given different numbers here to illustrate that, at a minimum, they are different copies. A user may enter commands and information into the computer system 1100 through input devices such as a keyboard 1620 and pointing device 1610, commonly referred to as a mouse, trackball, or touch pad, and a scanner 1490. Other input devices (not shown) may include a microphone, joystick, game pad, satellite dish, or the like. These and other input devices are often connected to the processing unit 1200 through a user input interface 1600 that is coupled to the system bus 1210, but may be connected by other interface and bus structures, such as a parallel port, game port or a universal serial bus (USB). A display device 1910 or other type of display device is also connected to the system bus 1210 via an interface, such as a video interface 1900, which may in turn communicates with video memory (not shown). In addition to the display device 1910, computer systems also may include other peripheral output devices such as speakers 1970 and a printer 1960, which may be connected through an output peripheral interface 1950.

The computer system 1100 may operate in a networked or distributed environment using logical connections to one or more remote computers, such as a remote computer 1800. The remote computer 1800 may be a personal computer, a server, a router, a network PC, a peer device or other common network node, and typically includes many or all of the elements described above relative to the computer system 1100, although only a memory storage device 1810 has been illustrated in FIG. 6. The logical connections depicted in FIG. 6 include a local area network (LAN) 1710 and a wide area network (WAN) 1730, but may also include other networks/buses. Such networking environments are commonplace in homes, offices, enterprise-wide computer networks, intranets, and the Internet.

When used in a LAN networking environment, the computer system 1100 is connected to the LAN 1710 through a network interface or adapter 1700. When used in a WAN networking environment, the computer system 1100 generally includes a modem 1720 or other means for establishing communications over the WAN 1730, such as the Internet. The modem 1720, which may be internal or external, may be connected to the system bus 1210 via the user input interface 1600, or other appropriate mechanism. In a networked environment, program modules depicted relative to the computer system 1100, or portions thereof, may be stored in the remote memory storage device. By way of example, and not limitation, FIG. 6 illustrates one or more remote application programs 1850 as residing on the memory device 1810. It will be appreciated that the network connections shown are non-limiting examples and other means of establishing a communications link between the computers may be used.

In various embodiments, the present invention is directed to a computer system comprising that comprises a database, a processor in communication with the database, and at least one memory unit in communication with the processor. The database stores tick data regarding a tradable financial product. The tick data comprises time-stamped ticks of order data for the tradable financial product. The at least one memory unit includes instructions that are executed by the at least one processor such that the at least one processor is programmed to determine a liquidity cycle for the tradable financial product. The liquidity cycle has a cycle time period that comprises a plurality of discrete time intervals that span the cycle time period. The liquidity cycle is determined by: (i) generating a liquidity profile for the tradable financial product based on the tick data stored in the database by determining, for each discrete time interval in the cycle time period, a value related to a proportion of (a) the sum of tick counts for the discrete time interval over a look-back period of n cycle time periods, where $n \geq 2$, and (b) the sum of tick counts for each discrete time interval over the look-back period; and (ii) smoothing the liquidity profile using a smoothing function to generate the liquidity cycle, wherein the liquidity cycle represents an expected distribution of order flow by time interval over the cycle time period.

According to various implementations, the tick data comprises indicative quotes to buy the tradable financial product and indicative quotes to sell the tradable financial product. In addition, the tick data may comprise data regarding completed trades involving the tradable financial product. Also, the tick count for each time interval may be related to a number of ticks for the time interval. The tradable financial product may be a foreign currency exchange pair and the cycle time period is twenty-four hours. The discrete time intervals of the cycle time period may be discrete one-minute time intervals. The smoothing function may comprise a spectral filtering function.

The at least one memory unit may further include instructions such that the at least one processor is programmed to compute a flow-weighted average price (FWAP) for the tradable financial product based at least on the liquidity cycle for the tradable financial product and a FWAP trade time window. The FWAP may be computed based at least on: (i) a representative price for each time interval in the FWAP trade time window; and (ii) a weight for each time interval in the FWAP trade time window, wherein the weights are based on the liquidity cycle for the tradable financial product. The representative prices may be determined based on the tick data stored in the database. The FWAP may be proportional to a sum of products, wherein there is a product for each time interval in the FWAP trade time window, and the product for each time interval is a product of the representative price for the time interval and the weight for the time interval. When the tradable financial product is a foreign currency exchange pair, the tick data may comprise indicative quotes to buy the foreign currency exchange pair and indicative quotes to sell the foreign currency exchange pair. The tick data may additionally comprise paid-given data for the foreign currency exchange pair.

According to other embodiments, the present invention is directed to a computer-implemented method that comprises the step of determining, by a computer system, a liquidity cycle for a tradable financial product based on tick data regarding the tradable financial product stored in a database of the computer system. The tick data comprises time-stamped ticks of order data for the tradable financial product. The liquidity cycle has a cycle time period that comprises a plurality of discrete time intervals that span the cycle time period. Determining the liquidity cycle comprises: (i) generating a liquidity profile for the tradable financial product based on the tick data stored in the database by determining, for each discrete time interval in the cycle time period, a value related to a proportion of (a) the sum of tick counts for the discrete time interval over a look-back period of n cycle time periods, where n≧2, and (b) the sum of tick counts for each discrete time interval over the look-back period; and (ii) smoothing the liquidity profile using a smoothing function to generate the liquidity cycle, wherein the liquidity cycle represents an expected distribution of order flow by time interval over cycle time period.

According to other embodiments, the present invention is directed to a computer readable medium having stored thereon instructions, that when executed by a processor, cause the processor to determine a liquidity cycle for a tradable financial product based on tick data regarding the tradable financial product. The tick data comprises time-stamped ticks of order data for the tradable financial product. The liquidity cycle has a cycle time period that comprises a plurality of discrete time intervals that span the cycle time period. The liquidity cycle is determined by: (i) generating a liquidity profile for the tradable financial product based on the tick data stored in the database by determining, for each discrete time interval in the cycle time period, a value related to a proportion of (a) the sum of tick counts for the discrete time interval over a look-back period of n cycle time periods, where n≧2, and (b) the sum of tick counts for each discrete time interval over the look-back period; and (ii) smoothing the liquidity profile using a smoothing function to generate the liquidity cycle, wherein the liquidity cycle represents an expected distribution of order flow by time interval over cycle time period.

Reference throughout the specification to "various embodiments," "some embodiments," "one embodiment," "an embodiment," and the like means that a particular feature, structure, or characteristic described in connection with the embodiment is included in at least one embodiment. Thus, appearances of the phrases "in various embodiments," "in some embodiments," "in one embodiment," "in an embodiment," and the like in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
    a database for storing tick data regarding a tradable financial product, wherein the tick data comprises time-stamped ticks of order data for the tradable financial product;
    a processor in communication with the database; and
    at least one memory unit in communication with the processor, wherein the at least one memory unit includes instructions that are executed by the at least one processor such that the at least one processor is programmed to:
        determine a liquidity cycle for the tradable financial product, wherein the liquidity cycle has a cycle time period that comprises a plurality of discrete time intervals that span the cycle time period, wherein the liquidity cycle is determined by:
            generating a liquidity profile for the tradable financial product based on the tick data stored in the database by determining, for each discrete time interval in the cycle time period, a value related to a proportion of (i) the sum of tick counts for the discrete time interval over a look-back period of n cycle time periods, where n>2, and (ii) the sum of tick counts for each discrete time interval over the look-back period;
            smoothing the liquidity profile using a smoothing function to generate the liquidity cycle, wherein the liquidity cycle represents an expected distribution of order flow by time interval over the cycle time period;
        compute a flow-weighted average price (FWAP) for the tradable financial product based at least on the liquidity cycle for the tradable financial product and a FWAP trade time window; and
        output the computed FWAP for the tradable financial product.

2. The computer system of claim 1, wherein the tick data comprises indicative quotes to buy the tradable financial product and indicative quotes to sell the tradable financial product.

3. The computer system of claim 2, wherein the tick data additionally comprises data regarding completed trades involving the tradable financial product.

4. The computer system of claim 1, wherein the tick count for each time interval is related to a number of ticks for the time interval.

5. The computer system of claim 1, wherein:
    the tradable financial product is a foreign currency exchange pair; and
    the cycle time period is twenty-four hours.

6. The computer system of claim 5, wherein the discrete time intervals of the cycle time period are discrete one-minute time intervals.

7. The computer system of claim 1, wherein the smoothing function comprises a spectral filtering function.

8. The computer system of claim 1, wherein the FWAP is computed based at least on:
    a representative price for each time interval in the FWAP trade time window; and
    a weight for each time interval in the FWAP trade time window, wherein the weights are based on the liquidity cycle for the tradable financial product.

9. The computer system of claim 8, wherein the representative prices are determined based on the tick data stored in the database.

10. The computer system of claim 9, wherein the FWAP is proportional to a sum of products, wherein there is a product for each time interval in the FWAP trade time window, and the product for each time interval is a product of the representative price for the time interval and the weight for the time interval.

11. The computer system of claim 10, wherein:
the tradable financial product is a foreign currency exchange pair; and
the tick data comprises indicative quotes to buy the foreign currency exchange pair and indicative quotes to sell the foreign currency exchange pair.

12. The computer system of claim 11, wherein the tick data additionally comprises paid-given data for the foreign currency exchange pair.

13. The computer system of claim 11, wherein:
the cycle time period is twenty-four hours; and
the discrete time intervals of the cycle time period are discrete one-minute time intervals.

14. A computer-implemented method comprising:
determining, by a computer system, a liquidity cycle for a tradable financial product based on tick data regarding the tradable financial product stored in a database of the computer system, wherein the tick data comprises time-stamped ticks of order data for the tradable financial product, wherein the liquidity cycle has a cycle time period that comprises a plurality of discrete time intervals that span the cycle time period, and wherein determining the liquidity cycle comprises:
generating a liquidity profile for the tradable financial product based on the tick data stored in the database by determining, for each discrete time interval in the cycle time period, a value related to a proportion of (i) the sum of tick counts for the discrete time interval over a look-back period of n cycle time periods, where $n \geq 2$, and (ii) the sum of tick counts for each discrete time interval over the look-back period; and
smoothing the liquidity profile using a smoothing function to generate the liquidity cycle, wherein the liquidity cycle represents an expected distribution of order flow by time interval over the cycle time period;
computing by the computer system a flow-weighted average price (FWAP) for the tradable financial product based at least on the liquidity cycle for the tradable financial product and a FWAP trade time window; and
outputting by the computer system the computed FWAP for the tradable financial product.

15. The method of claim 14, wherein the tick data comprises indicative quotes to buy the tradable financial product and indicative quotes to sell the tradable financial product.

16. The method of claim 15, wherein the tick data additionally comprises data regarding completed trades involving the tradable financial product.

17. The method of claim 14, wherein the tick count for each time interval is related to a number of ticks for the time interval.

18. The method of claim 14, wherein:
the tradable financial product is a foreign currency exchange pair; and
the cycle time period is twenty-four hours.

19. The method of claim 18, wherein the discrete time intervals of the cycle time period are discrete one-minute time intervals.

20. The method of claim 14, wherein the smoothing function comprises a spectral filtering function.

21. The method of claim 14, wherein the FWAP is computed based at least on:
a representative price for each time interval in the FWAP trade time window; and
a weight for each time interval in the FWAP trade time window, wherein the weights are based on the liquidity cycle for the tradable financial product.

22. The method of claim 21, wherein the representative prices are determined based on the tick data stored in the database.

23. The method of claim 22, wherein the FWAP is proportional to a sum of products, wherein there is a product for each time interval in the FWAP trade time window, and the product for each time interval is a product of the representative price for the time interval and the weight for the time interval.

24. The method of claim 23, wherein:
the tradable financial product is a foreign currency exchange pair; and
the tick data comprises indicative quotes to buy the foreign currency exchange pair and indicative quotes to sell the foreign currency exchange pair.

25. The method of claim 24, wherein the tick data additionally comprises paid-given data for the foreign currency exchange pair.

26. The method of claim 24, wherein:
the cycle time period is twenty-four hours; and
the discrete time intervals of the cycle time period are discrete one-minute time intervals.

27. A non-transitory computer readable medium having stored thereon instructions, that when executed by a processor, cause the processor to:
determine a liquidity cycle for a tradable financial product based on tick data regarding the tradable financial product, wherein the tick data comprises time-stamped ticks of order data for the tradable financial product, wherein the liquidity cycle has a cycle time period that comprises a plurality of discrete time intervals that span the cycle time period, and wherein the liquidity cycle is determined by:
generating a liquidity profile for the tradable financial product based on the tick data stored in the database by determining, for each discrete time interval in the cycle time period, a value related to a proportion of (i) the sum of tick counts for the discrete time interval over a look-back period of n cycle time periods, where $n \geq 2$, and (ii) the sum of tick counts for each discrete time interval over the look-back period;
smoothing the liquidity profile using a smoothing function to generate the liquidity cycle, wherein the liquidity cycle represents an expected distribution of order flow by time interval over the cycle time period;
compute a flow-weighted average price (FWAP) for the tradable financial product based at least on the liquidity cycle for the tradable financial product and a FWAP trade time window;
output the computed FWAP for the tradable financial product.

28. The computer readable medium of claim 27, wherein the tick count for each time interval is related to a number of ticks for the time interval.

29. The computer readable medium of claim 27, wherein the FWAP is computed based at least on:
a representative price for each time interval in the FWAP trade time window; and a weight for each time interval in the FWAP trade time window, wherein the weights are based on the liquidity cycle for the tradable financial product.

30. The computer readable medium of claim 29, wherein the representative prices are determined based on the tick data stored in the database.

31. The computer readable medium of claim 30, wherein the FWAP is proportional to a sum of products, wherein there is a product for each time interval in the FWAP trade time window, and the product for each time interval is a product of the representative price for the time interval and the weight for the time interval.

\* \* \* \* \*